United States Patent
Calmelat et al.

(10) Patent No.: US 8,170,771 B2
(45) Date of Patent: May 1, 2012

(54) FLUID-POWERED THRUST REVERSER ACTUATION SYSTEM SPEED CONTROL

(75) Inventors: Michael J. Calmelat, Chandler, AZ (US); David M. Eschborn, Gilbert, AZ (US); Cal Potter, Mesa, AZ (US); Kevin K. Chakkera, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 975 days.

(21) Appl. No.: 12/165,408

(22) Filed: Jun. 30, 2008

(65) Prior Publication Data

US 2009/0326783 A1 Dec. 31, 2009

(51) Int. Cl.
*F02K 1/76* (2006.01)
(52) U.S. Cl. ............... 701/100; 60/226.2; 60/232
(58) Field of Classification Search ............ 701/100; 244/110 B; 60/226.2, 232, 615, 620; *F02K 1/56, F02K 1/76*
See application file for complete search history.

(56) References Cited

U.S. PATENT DOCUMENTS

| | | | | |
|---|---|---|---|---|
| 3,696,895 A * | 10/1972 | Schaffer et al. | ............ | 477/186 |
| 4,391,409 A | 7/1983 | Scholz | | |
| 5,609,020 A * | 3/1997 | Jackson et al. | ............ | 60/226.2 |
| 6,519,929 B2 | 2/2003 | Ahrendt | | |
| 6,564,541 B2 | 5/2003 | Ahrendt | | |
| 6,684,623 B2 | 2/2004 | Langston et al. | | |
| 7,275,362 B2 * | 10/2007 | Strunk et al. | ............ | 60/226.2 |
| 7,278,257 B2 * | 10/2007 | Colotte et al. | ............ | 60/226.2 |
| 7,370,468 B2 * | 5/2008 | Colotte et al. | ............ | 60/226.2 |
| 7,690,190 B2 * | 4/2010 | Thornock et al. | ............ | 60/226.2 |
| 8,006,479 B2 * | 8/2011 | Stern | ............ | 60/226.2 |
| 2003/0066283 A1 * | 4/2003 | Ahrendt | ............ | 60/204 |
| 2003/0101712 A1 * | 6/2003 | Johnson et al. | ............ | 60/226.2 |
| 2004/0068977 A1 * | 4/2004 | McKay | ............ | 60/226.2 |
| 2007/0234707 A1 * | 10/2007 | Beardsley | ............ | 60/226.2 |
| 2008/0010969 A1 * | 1/2008 | Hauer et al. | ............ | 60/204 |
| 2008/0246421 A1 * | 10/2008 | Harvey et al. | ............ | 318/14 |
| 2009/0188233 A1 * | 7/2009 | Vauchel et al. | ............ | 60/226.2 |
| 2009/0193789 A1 * | 8/2009 | Pero | ............ | 60/226.2 |
| 2010/0115915 A1 * | 5/2010 | Dehu et al. | ............ | 60/226.2 |
| 2010/0139242 A1 * | 6/2010 | Vauchel et al. | ............ | 60/226.2 |

* cited by examiner

*Primary Examiner* — Tuan C. To
(74) *Attorney, Agent, or Firm* — Ingrassia Fisher & Lorenz, P.C.

(57) ABSTRACT

A fluid-powered thrust reverser actuation speed control system and method are provided. A drive fluid is supplied to a fluid-powered drive mechanism that is coupled to a thrust reverser movable component to thereby move the thrust reverser movable component at a first movement speed. A determination is made as to when the thrust reverser movable component attains a predetermined position. In response to the thrust reverser movable component attaining the predetermined position, the drive fluid supplied to the fluid-powered drive mechanism is controlled to thereby move the thrust reverser movable component at a second movement speed that is less than the first movement speed.

16 Claims, 3 Drawing Sheets

FLUID-POWERED THRUST REVERSER ACTUATION SYSTEM SPEED CONTROL

TECHNICAL FIELD

The present invention generally relates to fluid-powered thrust reverser actuation control systems and, more particularly, to a speed control system and method for such systems.

BACKGROUND

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes. Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle. Pivot door thrust reversers may utilize four doors on the engine nacelle as the moveable thrust reverser components. In the deployed position, these doors extend outwardly from the nacelle to redirect the jet thrust.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. In the stowed position, the thrust reversers do not redirect the jet engine's thrust. The moveable thrust reverser components in each of the above-described designs are moved between the stowed and deployed positions by actuators. Power to drive the actuators may come from one or more drive mechanisms, which may be pneumatically or hydraulically driven, depending on the system design. A drive train that includes one or more drive shafts, such as flexible rotating shafts, may interconnect the actuators and the one or more drive mechanisms to transmit the drive mechanism drive force to the moveable thrust reverser components and/or to synchronize the reverser components.

Each of the above-described thrust reverser system configurations is robustly designed, and is safe and reliable. Nonetheless, each can suffer certain drawbacks. For example, these systems may experience undesirably hard impacts at an end-of-stroke position. These impacts can have both long-term and short-term deleterious effects.

Hence, there is a need for a system and method of preventing, or at least inhibiting, end-of-stroke impacts in thrust reverser actuation systems. The present invention addresses at least this need.

BRIEF SUMMARY

In one embodiment, and by way of example only, a method of controlling the movement speed of a thrust reverser movable component includes supplying a drive fluid to a fluid-powered drive mechanism that is coupled to the thrust reverser movable component to thereby move the thrust reverser movable component at a first movement speed. A determination is made as to when the thrust reverser movable component attains a predetermined position. In response to the thrust reverser movable component attaining the predetermined position, the drive fluid supplied to the fluid-powered drive mechanism is controlled to thereby move the thrust reverser movable component at a second movement speed that is less than the first movement speed.

In another exemplary embodiment, an aircraft thrust reverser control system includes a thrust reverser movable component, a fluid-powered drive mechanism, and a control unit. The fluid-powered drive mechanism is coupled to the thrust reverser movable component and is adapted to receive drive fluid. The fluid-powered drive mechanism is responsive to the drive fluid to move the thrust reverser movable component at a movement speed. The control unit is operable to determine thrust reverser movable component position and to control the drive fluid to the fluid-powered drive mechanism to move the thrust reverser movable component at a first movement speed, and when the thrust reverser movable component attains a predetermined position, to move the thrust reverser movable component at a second movement speed that is less than the first movement speed.

Furthermore, other desirable features and characteristics of the thrust reverser actuation system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although embodiments of the invention are described herein in the context of pneumatically powered systems, it will be appreciated that the inventive concepts are equally applicable to other types of fluid-powered systems, such as hydraulically powered systems.

Figure 1:
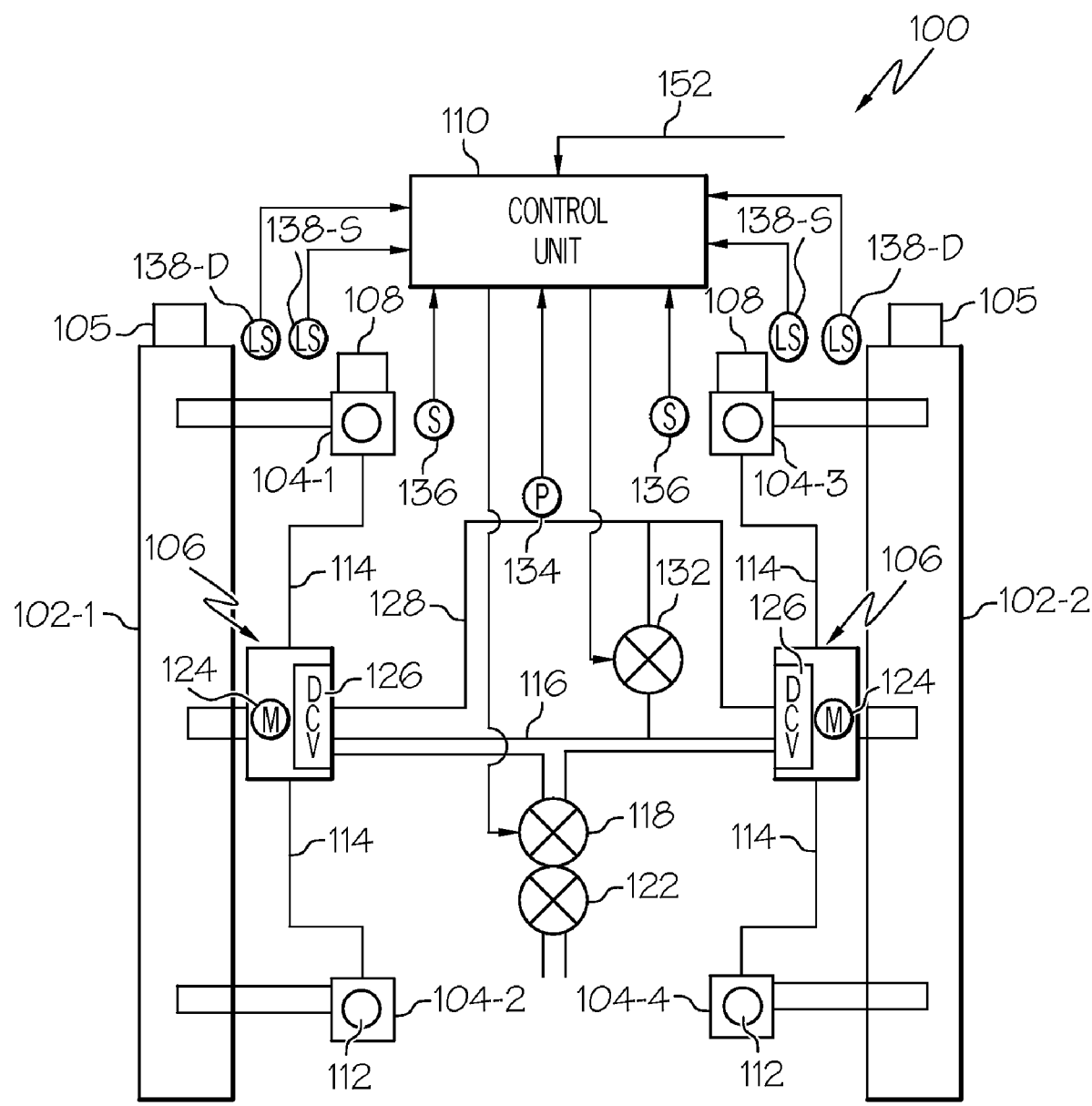
FIG. 1 is a functional block diagram of an exemplary fluid-powered thrust reverser actuation system.

Turning now to FIG. 1, a functional block diagram of an exemplary fluid-powered thrust reverser actuation system is depicted. The system 100 includes a plurality of thrust reverser movable components 102, a plurality of actuator assemblies 104, a plurality of fluid-powered drive mechanisms 106, and a control unit 110. The thrust reverser movable components 102 are movable between a stowed position and a deployed position and, at least in the depicted embodiment, each is held in the stowed position via a tertiary lock 105. The thrust reverser movable components 102 may be implemented as any one of numerous types of components, depending upon the particular type of thrust reverser actuation system being implemented. For example, the thrust reverser movable components 102 may be implemented as transcowls if the thrust reverser actuation system 100 is a cascade-type thrust reverser system, or as a plurality of doors if the thrust reverser actuation system 100 is a target-type thrust reverser system or pivot door thrust reverser system. Moreover, while two thrust reverser movable components 102 (102-1, 102-2) are depicted, it will be appreciated that the system 100 may be implemented with more than this number.

The actuator assemblies 104 are individually coupled to the thrust reverser movable components 102. In the depicted embodiment, the system 100 includes four actuator assemblies 104-1, 104-2, 104-3, 104-4, with two of the actuator assemblies 104-1, 104-2 being coupled to one of the thrust reverser movable components 102-1, and the other two actuator assemblies 104-3, 104-4 being coupled to the other thrust reverser movable component 102-2. One or more of the actuator assemblies 104 that are coupled to each thrust reverser movable component 102 may include a lock 108. Moreover, one or more of the actuator assemblies 104 that are coupled to each thrust reverser movable component 102 may include a position sensor 112. It is noted that the actuator assemblies 104 may be implemented using any one of numerous types of actuator assemblies now known or developed in the future. Some non-limiting examples of suitable actuator assemblies include ballscrew actuators, roller screw actuators, and piston-type actuators, just to name a few. It is additionally noted that the number, arrangement, and configuration (e.g., with or without locks, position sensors, etc.) of the actuator assemblies 104 is not limited to the arrangement depicted in FIG. 1, but could include other numbers, arrangements, and configurations of actuator assemblies 104.

The fluid-powered drive mechanisms 106 are each coupled, via one or more of the actuator assemblies 104, to one of the thrust reverser movable components 102. More specifically, at least in the depicted embodiment, each fluid-powered drive mechanism 106 is preferably coupled to two of the actuator assemblies 104 via a pair of drive shafts 114. The drive shafts 114, if included, are preferably implemented as flexible shafts. It will be appreciated that in some embodiments, one or both of the actuator assemblies 104 associated with each thrust reverser movable component 102 may also be interconnected via flexible shafts 114. Using flexible shafts in this configuration preferably ensures that the actuator assemblies 104 and thrust reverser movable components 102 move in a substantially synchronized manner. For example, when one thrust reverser movable component 102-1 is moved, the other thrust reverser movable component 102-2 is substantially simultaneously moved a like distance. In other embodiments, alternative synchronization mechanisms such as, for example, electrical synchronization or open loop synchronization, may instead be used. It will additionally be appreciated that in some embodiments the system 100 could be implemented using a single fluid-powered drive mechanism 106 to simultaneously drive all of the actuator assemblies 104.

No matter the specific number of fluid-powered drive mechanisms 106 that are included, each is coupled to selectively receive a drive fluid from a non-illustrated fluid source. In the depicted embodiment, in which the system 100 is a pneumatic-type system, the drive fluid is pressurized air that is supplied from a non-illustrated pressurized air source via a drive fluid supply line 116. A control valve 118 and, at least in the depicted embodiment, a check valve 122 are mounted on the drive fluid supply line. The control valve 118, as will be described in more detail further below, is responsive to control valve commands supplied from the control unit 110 to selectively supply the drive fluid to the fluid-powered drive mechanisms 106. The fluid-powered drive mechanisms 106, upon receipt of the drive fluid, each supply a drive force, via the associated drive shafts 114 and actuator assemblies 104, that moves one of the thrust reverser movable components 102 in either a deploy direction or a stow direction, and at a controlled movement speed.

The manner in which the fluid-powered drive mechanisms 106 are controlled, to in turn control the movement direction and movement speed of the thrust reverser movable components 102, will be described momentarily. Before doing so, however, it is noted that the fluid-powered drive mechanisms 106 may be implemented using any one of numerous suitable devices. In the depicted embodiment, in which the system 100 is implemented as a pneumatic-type system, the fluid-powered drive mechanisms 106 each include a pneumatic motor 124 and a fluid-powered control mechanism 126. Though not depicted, the fluid-powered drive mechanisms 106 may also each include a suitably configured brake device and/or a suitably configured manual drive device, if needed or desired. The pneumatic motors 124 are each responsive, upon receipt of pressurized air, to rotate and supply a drive torque to its associated actuator assemblies 104, which in turn supply a drive force to the associated thrust reverser movable component 102. The direction and speed of pneumatic motor rotation, and hence the direction and speed of thrust reverser movable component movement, depends upon the direction and the pressure (or flow) of the pressurized air supplied to the pneumatic motors 124. The direction and pressure (or flow) of the pressurized air to the pneumatic motors 124 is controlled by the associated fluid-powered control mechanism 126.

The fluid-powered control mechanisms 126 are each coupled to receive a control fluid via a control fluid line 128. The fluid-powered control mechanisms 126, in response to the control fluid, are positioned to control the direction and pressure (or flow) of the drive fluid (e.g., pressurized air) to its associated pneumatic motor 124. In the depicted embodiment, the fluid-powered control mechanisms 126 are integral to the fluid-powered drive mechanisms 106. It will be appreciated, however, that the fluid-powered control mechanisms 126 could be formed separate from the fluid-powered drive mechanisms 106. The fluid-powered control mechanisms 126 may also be variously implemented. In one particular embodiment, the fluid-powered control mechanisms 126 are implemented as piston-operated valves. In this embodiment, the fluid-powered control mechanisms 126 may also be referred to as directional control valves (DCVs). No matter the specific implementation, the pressure (or flow) of control fluid to the fluid-powered control mechanisms 126 is controlled by a pilot valve 132.

As FIG. 1 depicts, the pilot valve 132 is mounted on the control fluid line 128. The pilot valve 132, in response to control signals supplied from the control unit 110, controls the pressure (or flow) of control fluid to the fluid-powered control mechanisms 126, to thereby control the direction and pressure (or flow) of drive fluid through the fluid-powered control mechanisms 126 and to the pneumatic motors 124. Hence, as will be described further below, the control signals that the control unit 110 supplies to the pilot valve 132 ultimately control the movement direction and movement speed of the thrust reverser movable components 102. It will be appreciated that the pilot valve 132 may be variously implemented to be responsive to the control signals 110 supplied to it from the control unit 110. Some non-limiting examples of suitable devices include a solenoid valve and/or a torque motor drive. Moreover, although the depicted system 100 is implemented with a single pilot valve 132, it will be appreciated that the system 100 could alternatively be implemented with two pilot valves 132, with each one being associated with one of the fluid-powered control mechanism 126.

Before proceeding further, it is seen that the depicted system 100 additionally includes a pressure sensor 134, a plurality of speed sensors 136, and a plurality of thrust reverser movable component position sensors 138. The pressure sensor 134 is disposed to sense control fluid pressure, and is configured to supply a control pressure signal representative thereof to the control unit 110. The control pressure signal may be used to determine the force and directional control being used to position the fluid-powered control mechanisms 126. Although the depicted system 100 includes a single pressure sensor 134, it will be appreciated that two or more pressure sensors 134 could be included.

The speed sensors 136 are configured to sense the movement speed of the thrust reverser movable components 102, and to supply speed signals representative thereof to the control unit 110. In the depicted embodiment, each speed sensor 136 is configured to sense the movement speed of one of the thrust reverser movable components 102. The speed sensors 136 may be variously implemented to sense, either directly or indirectly, the movement speed of the thrust reverser movable components 102. In one particular embodiment, the speed sensors 136 are each implemented using a monopole pickup disposed in proximity to a target that moves, either linearly or rotationally, at the same speed as, or at a speed that is proportional to, the thrust reverser movable components. For example, the speed sensors 136 could be configured and disposed to sense the rotational speed of the pneumatic motors 124.

The position sensors 138 are configured to sense at least when the thrust reverser movable components 102 attain end-of-stroke positions. That is, the positions sensors 138 sense at least when the thrust reverser movable components reach stowed and deployed positions. The position sensors 138 may be variously configured and implemented, but in the depicted embodiment the position sensors 138 are implemented using a plurality of limit switches that are configured to discretely sense when the thrust reverser movable components are at or near the stowed positions and at or near the full-deployed positions. In this regard, the depicted system 100 includes at least a stowed limit switch 138-S associated with each thrust reverser movable component 102, and a deployed limit switch 138-D associated with each thrust reverser movable component 102. No matter the particular number, configuration, and implementation of the position sensors 138, the position signals from each are supplied to the control unit 110.

The control unit 110, a particular embodiment of which will be described in more detail further below, receives a thrust reverser position command 152 from, for example, a non-illustrated aircraft system. The depicted control unit 110 also receives the above-mentioned control pressure signal, speed signals, and position signals. The control unit 110 is operable, in response to at least the thrust reverser position command 152, to control selected ones of the above described devices to controllably move the thrust reverser movable components 102 to the commanded position. More specifically, the control unit 110 is operable to determine thrust reverser movable component position and, based on the determined position, to control the drive fluid to the fluid-powered drive mechanisms 126 to move the thrust reverser movable components 102 at either a first movement speed or a second, slower movement speed. The control unit 110 initially controls the thrust reverser movable components 102 to move at the first movement speed. However, when the thrust reverser movable components 102 attain a predetermined position, the control unit 110 then controls the thrust reverser movable components 102 to move at the second movement speed.

It will be appreciated that the specific position at which the movement speed is lowered from the first movement speed to the second movement speed may vary, and will also depend upon whether the thrust reverser movable components 102 are being moved from the stowed position to the deployed position, or from the deployed position to the stowed position. For example, when the thrust reverser movable components 102 are being moved from the stowed position to the deployed position, the predetermined position at which the movement speed change occurs is a suitable position short of the fully deployed position. Similarly, when the thrust reverser movable components 102 are being moved from the deployed position to the stowed position, the predetermined position at which the movement speed change occurs is a suitable position short of the stowed position.

Figure 2:
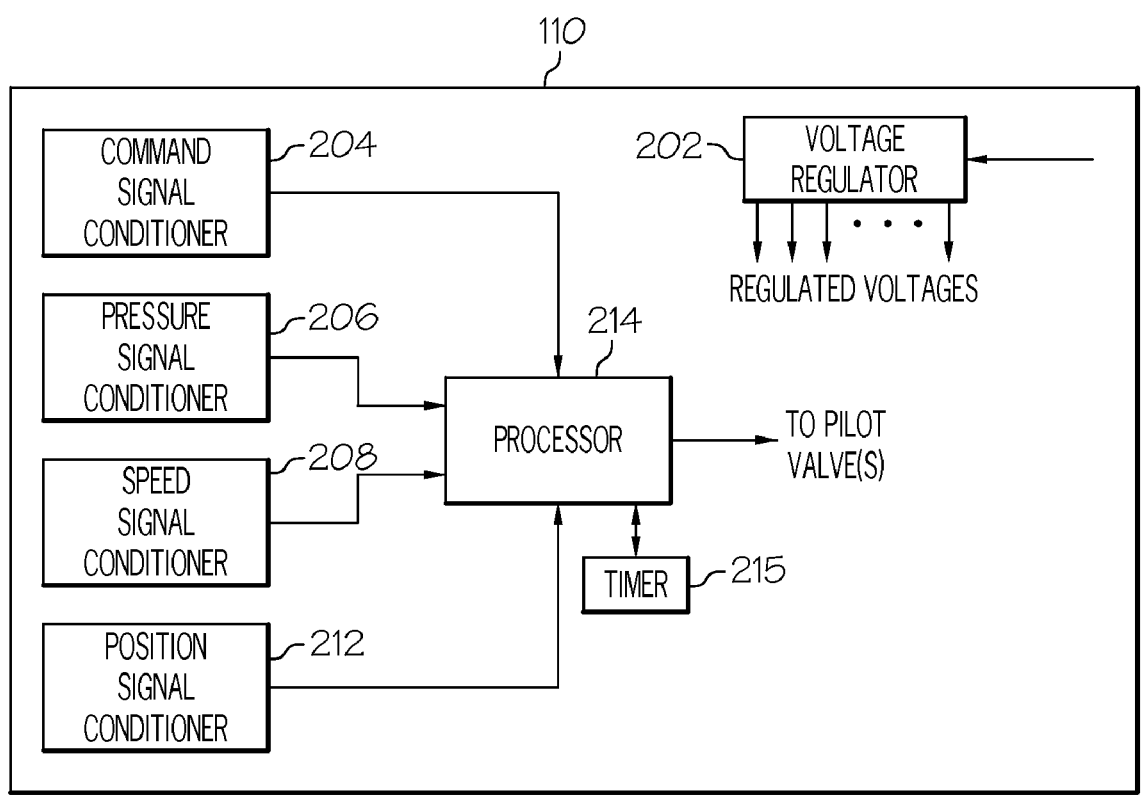
FIG. 2 is a functional block diagram of an exemplary control unit that may be used to implement the system of FIG. 1.

To provide the above-described functionality, the control unit 110 implements closed loop speed control by controllably positioning the fluid-powered control mechanism 126. By doing so, the control unit 110 is able to reduce the movement speed of the thrust reverser movable components 102 sufficiently to eliminate excessive end-of-stroke impact. A particular embodiment of the control unit 110 is depicted in functional block diagram form in FIG. 2, and with reference thereto will now be described.

The depicted control unit 110, which is merely exemplary of one suitable embodiment for carrying out the above-described functionality, includes a voltage regulator 202, a command signal conditioner 204, a pressure signal conditioner 206, a speed signal conditioner 208, a position signal conditioner 212, and a processor 214. The control unit 110 is configured to receive electrical power from a non-illustrated electrical power source. The voltage regulator 202, via suitably configured converters (e.g., DC-DC or AC-DC) supplies regulated control voltages (e.g., ±5VDC, +15VDC, 2.8VDC, etc.) to the remainder of the control unit 110.

As noted above, the control unit 110 receives thrust reverser position commands 152 to either deploy or stow the thrust reverser movable components 102. The command signal conditioner 202 conditions and filters the commands 152, as needed, and supplies the conditioned and filtered commands to the processor 214. The pressure signal conditioner 204 receives the control pressure signals supplied from the pressure sensor(s) 134, the speed signal conditioner 206 receives the speed signals supplied from the speed sensors 136, and the position signal conditioner 208 receives the position signals supplied from the position sensors 138. The pressure signal conditioner 204, speed signal conditioner 206, and position signal conditioner 208 condition and filter, as needed, the control pressure signals, the speed signals, and the position signals, respectively, and supply the conditioned and filtered signals to the processor 214.

The processor 214 is coupled to receive the conditioned and filtered thrust reverser position commands, control pressure signals, speed signals, and position signals. The processor 214, in response to these signals, supplies control signals to the pilot valve(s) 132 to control the direction and movement speed of the thrust reverser movable components 102, as described above. More specifically, the processor 214 determines the commanded thrust reverser movement direction from the conditioned and filtered thrust reverser position commands, and how much force and what directional control is being provided to the fluid-powered control mechanisms 126 from the conditioned and filtered control pressure signal. The processor 214 uses the conditioned and filtered speed signals to determine, via integration, the position of the thrust reverser movable components 102 and, implementing closed loop speed control, to generate and supply the control signals to the pilot valve(s) 132. It will be appreciated that the processor 214 may be implemented using one or more analog devices, one or more digital devices, or a combination thereof. Preferably, however, the processor 214 is implemented using a suitable programmable digital processing device. One advantage of using a digital device is that it can learn end-of-stroke positions and the number of device rotations required for a stroke.

Having described a particular embodiment of a pneumatic thrust reverser actuation system 100, an exemplary control unit 110 that may be used in the system 100, and the general control methodology implemented thereby, a more detailed description of an exemplary overall control process will now be provided. In doing so, reference should be made to FIG. 3, which depicts the control process 300 in flowchart form, in combination with FIGS. 1 and 2 as needed. It should be noted that the parenthetical references in the following description refer to like-numbered flowchart blocks in FIG. 3.

In the depicted embodiment, when the system 100 is powered on (302) a determination is made as to whether this is an initial system power-up (304). If it is an initial power-up, then an initial stroke calibration (306) is conducted. The initial stroke calibration (306) includes automatically moving the thrust reverser movable components 102 to the fully-deployed positions and counting, for example, the number of revolutions of the motors 124 (308), and then automatically returning the thrust reverser movable components 102 to the stowed positions and again counting the number of revolutions of the motors 124 (312). It is noted that the stroke calibration, at least for the embodiment depicted in FIG. 1, may be performed at the level of the fluid-powered drive mechanisms 106, since the fluid-powered drive mechanisms 106 dictate the position of the actuator assemblies 104.

After the stroke calibration (306), or if the power-up was not an initial power up, various built-in tests (BIT) may be conducted (314), and a determination is made as to whether any BIT errors were generated (316). If so, the BIT errors are logged in memory (e.g., EEPROM) (318). If not, then a determination is made as to whether a thrust reverser position command 152 is received (322). If a position command 152 is not received, the system 100 continuously awaits receipt of a position command 152 by repeatedly making this determination (322).

When a position command 152 is received, the control unit 110 supplies a command signal to the control valve 118 so that it opens and supplies drive fluid and control fluid to the remainder of the system 100 (326). The control unit 110 also supplies suitable control signals to the pilot valve(s) 132 so that the control fluid appropriately positions the fluid-powered control mechanisms 126 to supply drive fluid to the motors 124 in a direction that will move the thrust reverser movable components 102 toward the commanded position (328). In addition, the processor 214, at least in this embodiment, starts a timer 215 (see FIG. 2) (330). It is noted that the timer 215, if included, may be internal or external to the processor 214, and is used to compare the time that the thrust reverser movable components 102 have been moving to, for example, pulses that are generated during movement.

While the thrust reverse movable components 102 are moving, the control pressure and movement speeds are monitored (332). The control unit 110, implementing the above-described closed loop speed control, supplies control signals to the pilot valve(s) 132 to control the movement speed of the thrust reverser movable components 102 to the first movement speed (334). The control unit 110 also determines the position of the thrust reverser movable components 102 from, for example, the monitored movement speed (336).

As the thrust reverser movable components 102 are being moved toward the commanded position, a determination is made as to when the thrust reverser movable components 102 attain the predetermined position (338). As noted above, the predetermined position is a near-end-of-stroke position relative to the fully-stowed position or fully-deployed position, depending upon the movement direction of the thrust reverser movable components 102. In any case, when it is determined that the thrust reverser movable components 102 attain the predetermined position, the control unit 110 supplies control signals to the pilot valve(s) 132 to control the movement speed of the thrust reverser movable components 102 to the second movement speed (342).

The thrust reverser movable components 102 are thereafter moved at the second movement speed until it is determined that the thrust reverser movable components 102 have reached the end-of-stroke position (344). That is, the thrust reverser movable components 102 are either in the fully-stowed position or the fully-deployed position. In both cases, movement of the thrust reverser movable components 102 is ceased (346) by, for example, commanding the control valve 118 to close and no longer supplying control signals to the pilot valve(s) 118 (at least until another position command 152 is received).

Figure 3:
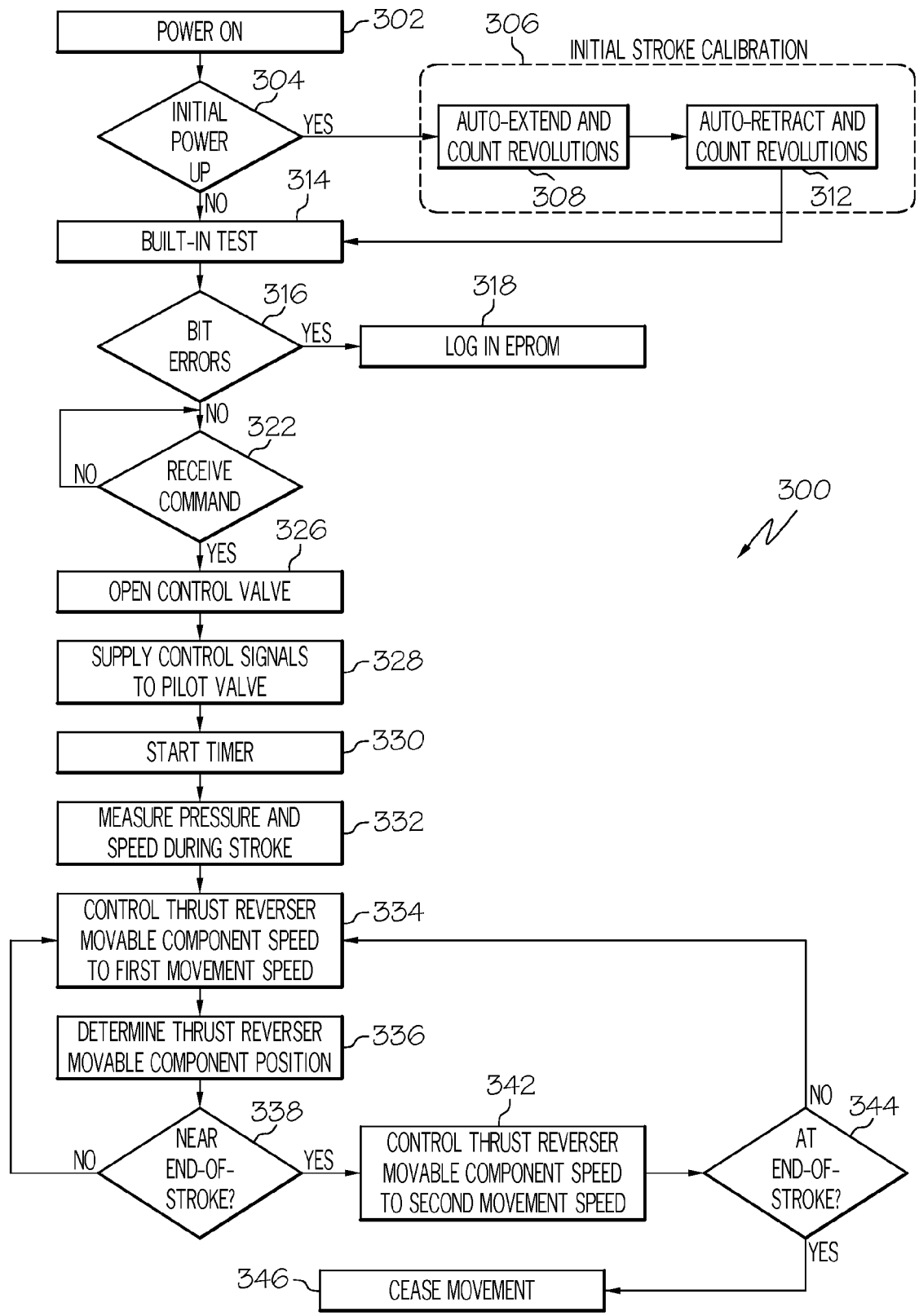
FIG. 3 depicts a process, in flowchart form, that may be implemented in the control unit of FIG. 2 to control the system of FIG. 1.

Before concluding, it is noted that the process 300 depicted in FIG. 3 and described above is not limited to pneumatic thrust reverser systems, such as the system 100 depicted in FIG. 1 and described herein. Rather, it may also be applied to various other fluid-powered thrust reverser actuation systems. For example, it may be applied to various hydraulic thrust reverser actuation systems. It will be appreciated that in some hydraulic thrust reverse actuation system embodiments, the fluid-powered drive mechanisms 106 may be formed as integral parts of one or more of the actuator assemblies 104.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling movement speed of a thrust reverser movable component, the method comprising:
   supplying a drive fluid to a fluid-powered drive mechanism that is coupled to the thrust reverser movable component to thereby move the thrust reverser movable component at a first movement speed;
   supplying a control fluid to a fluid-powered control mechanism, the fluid-powered control mechanism responsive to the control fluid to control the drive fluid supplied to the fluid-powered drive mechanism;
   determining when the thrust reverser movable component attains a predetermined position; and
   in response to the thrust reverser movable component attaining the predetermined position, controlling the control fluid supplied to the fluid-powered control mechanism to control the drive fluid supplied to the fluid-powered drive mechanism to thereby move the thrust reverser movable component at a second movement speed, the second movement speed less than the first movement speed.

2. The method of claim 1, further comprising:
   sensing thrust reverser movable component movement speed; and
   controlling the fluid supplied to the fluid-powered drive mechanism in accordance with a closed-loop speed control scheme.

3. The method of claim 1, further comprising:
   sensing thrust reverser movable component movement speed; and
   determining thrust reverser movable component position from the sensed thrust reverser movable component movement speed.

4. The method of claim 1, further comprising:
   determining when the thrust reverser movement component attains an end-of-stroke position; and
   in response to the thrust reverser movable component attaining the end-of-stroke position, ceasing to supply the fluid to the fluid-powered drive mechanism.

5. The method of claim 4, wherein the end-of-stroke position is a fully-deployed position.

6. The method of claim 4, wherein the end-of-stroke position is a stowed position.

7. The method of claim 1, wherein the drive fluid is air.

8. The method of claim 1, wherein the drive fluid is hydraulic fluid.

9. An aircraft thrust reverser control system, comprising:
   a thrust reverser movable component;
   a fluid-powered drive mechanism coupled to the thrust reverser movable component and adapted to receive drive fluid, the fluid-powered drive mechanism responsive to the drive fluid to move the thrust reverser movable component at a movement speed;
   a fluid-powered control mechanism coupled to the fluid-powered drive mechanism and adapted to receive a control fluid, the fluid-powered control mechanism responsive to the control fluid to control the drive fluid to the fluid-powered drive mechanism;
   a pilot valve in fluid communication with the fluid-powered control mechanism and coupled to receive control signals, the pilot valve responsive to the control signals to controllably supply the control fluid to the fluid-powered control mechanism; and
   a control unit operable to determine thrust reverser movable component position and selectively supply the control signals to the pilot valve, to thereby control the drive fluid to the fluid-powered drive mechanism to:
   (i) move the thrust reverser movable component at a first movement speed and,
   (ii) when the thrust reverser movable component attains a predetermined position, move the thrust reverser movable component at a second movement speed, the second movement speed less than the first movement speed.

10. The system of claim 9, further comprising:
    a speed sensor coupled to the control unit, the speed sensor operable to sense thrust reverser movable component movement speed and supply a speed signal representative thereof to the control unit,
    wherein the control unit is operable to control the drive fluid to the fluid-powered drive mechanism in accordance with a closed-loop speed control scheme.

11. The system of claim 9, further comprising:
    a speed sensor coupled to the control unit, the speed sensor operable to sense thrust reverser movable component movement speed and supply a speed signal representative thereof to the control unit,
    wherein the control unit is operable to determine thrust reverser movable component position from the speed signal.

12. The system of claim 9, further comprising:
    one or more position sensors coupled to the control unit, the one or more position sensors operable to sense at least when the thrust reverser movement component attains an end-of-stroke position and supply a position signal representative thereof to the control unit,
    wherein the control unit is further operable, in response to the thrust reverser movable component attaining the end-of-stroke position, to command the supply of the drive fluid to the fluid-powered drive mechanism to cease.

13. The system of claim 12, wherein the end-of-stroke position is a fully-deployed position.

14. The system of claim 12, wherein the end-of-stroke position is a stowed position.

15. The system of claim 9, wherein the drive fluid is air.

16. The system of claim 9, wherein the drive fluid is hydraulic fluid.

* * * * *